United States Patent Office 2,871,945
Patented Feb. 3, 1959

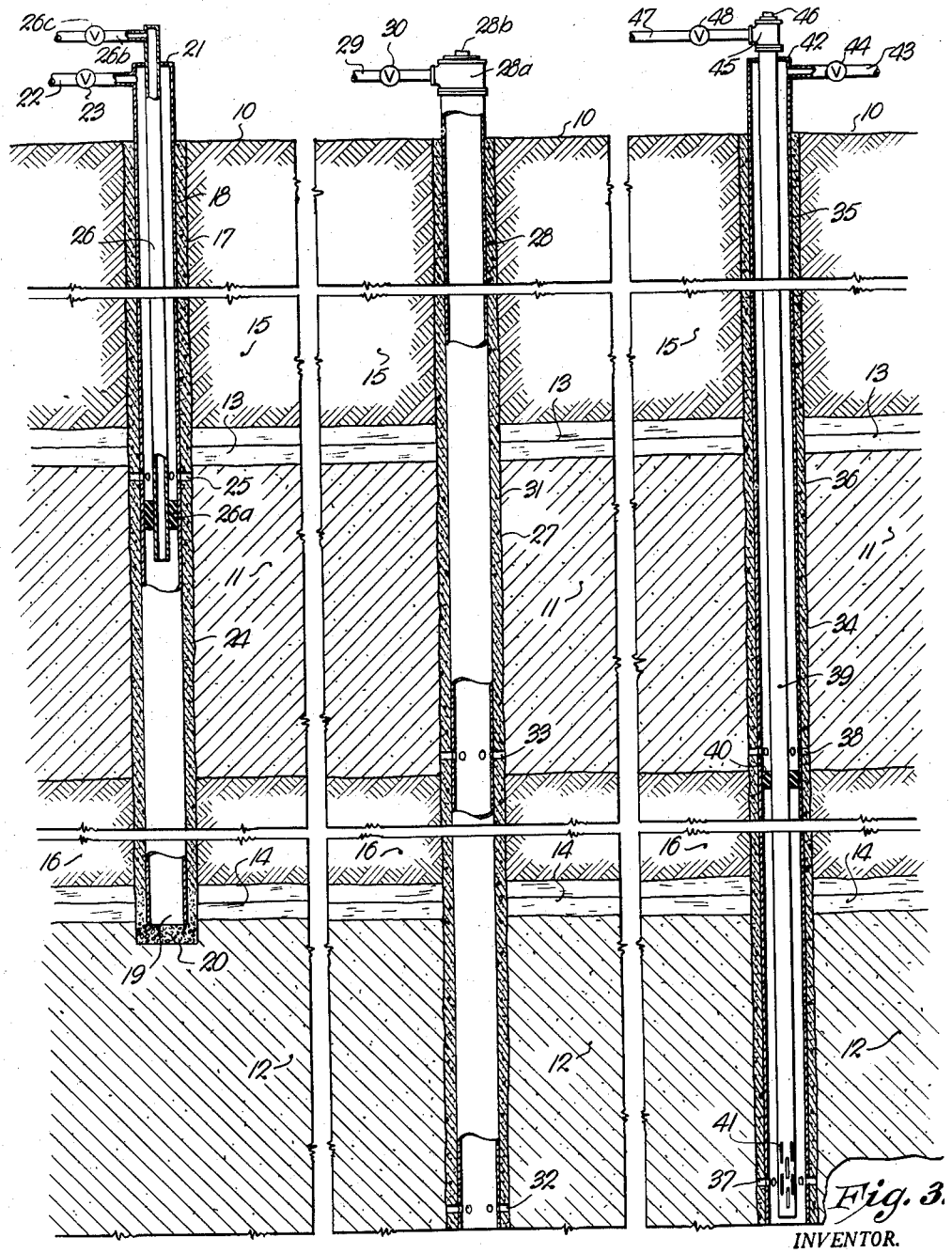

2,871,945

SINGLE CASING MULTIPLE HORIZON OIL PRODUCTION METHOD

Ralph Spearow, Paola, Kans.

Application September 21, 1956, Serial No. 611,266

4 Claims. (Cl. 166—52)

This invention relates to a method of producing oil wells having in a single well one or more producing horizons and refers more particularly to such a method wherein gaseous pressure is applied to the top portions of the horizons to be produced and oil is removed from the lower portions of said horizons. This method is designed to be employed either in newly drilled well locations or in secondary recovery production.

This application is an improvement over my copending application Serial No. 360,645, filed June 10, 1953, entitled "Multiple Horizon Oil Production Method," Patent No. 2,767,792. This application was a continuation-in-part of an application which issued as United States Patent No. 2,725,106 and related to subject matter contained in my United States Patent No. 2,593,497.

The present method represents an adaptation of the gas pressurization oil production techniques set forth in my previous patents to permit their employment in new wells or secondary recovery situations where it is desired to produce more than one oil horizon in a single well.

One of the distinctive features of my oil production methods as set forth in this and my previous applications and patents is that gaseous pressure is applied to the top portions of the oil horizons to be produced and oil is produced from the lower portions of said horizons, the oil within the horizon being driven vertically downwardly by pressurization. Such gaseous pressurization methods are feasible and workable only when the casings of the wells employed are properly sealed throughout portions of their length in, as well as above and below, the horizons to be produced.

For example, if separate pressurization and production wells are employed in such an oil production method, it is necessary for the production well casing to be sealed to the borehole wall from a point above the top of the oil horizon downwardly through the horizon to the oil intake zone on the production casing. Furthermore, it is necessary to seal the casing of the pressurization well to the well wall at the top of the oil horizon. If the pressurization well is not so sealed, the gaseous pressurizing agent will escape into the formation above the oil horizon, and pressure thus be lost and, if the production well is not so sealed, the pressurizing agent will diffuse along the top of the oil horizon until it reaches the production well and then pass upwardly into the earth formations above the horizon or down the outside of the unsealed production casing and escape through the oil intake holes in the production casing without producing oil or serving as a pressurizing agent.

Similar considerations apply when a single well is used both for presurization and production, but will not be detailed here as the present invention employs separate pressure and production wells.

The advantages of a successful gaseous pressurization method lie in the very high percentage of oil recovery from the sand and the minimal expense as compared with other pressurizing methods such as water drive.

Another great advantage of the Spearow gas pressurization methods, which, as set forth in the above listed applications and patents involves sealing the casings of the pressurization and production wells to the surrounding formations to permit no escape of pressure medium from the horizon except the oil withdrawal points, is the fact that when the pressurization of the horizon has proceeded to a certain level, it is possible to shut down the compressors and continue to produce oil by the agency of "sealed-in" pressures for a long time interval without further input of pressure into the horizon. This result is greatly in contrast to a pressurization method such as water drive, wherein shutting down of the water pumps causes the production of oil, by water drive means, to cease immediately. As an actual example of this performance of the Spearow method, in an operation in eastern Kansas, the compressors to a field of over twenty wells producing under gaseous pressurization were shut off for a period of over five weeks and at the end of this time, the wells were still flowing and pumping oil without any diminishing in volume. This is additional proof of the necessity of sealing the space between the casing and formations and the effectiveness of that sealing.

Previously, attempts have been made to produce oil wells by the introduction of gaseous pressure into the horizon and moving the oil horizontally through the sand. Attempts have also been made where the pressure was introduced into the horizon above the desired oil withdrawal zone. None of these methods has proved practical because the practice of properly sealing the pressurization and productin casings to the earth formation within the well as delineated above was not conceived and employed.

Many well locations have access to more than one oil horizon in a single borehole and it is advantageous to produce these multiple horizons from the single hole. Such a situation may occur either in original or secondary production and, thus, it is highly desirable that a method of producing such wells be provided utilizing gaseous pressurization with its concomitant advantages. In my previous application, Serial No. 360,645, I illustrated several methods of producing oil from multiple horizons. In each of these methods, separate pressurization and production wells were employed. In all cases, however, a plurality of casings was employed in each borehole, and in each well, independently of whether or not the well was a pressurization or production well, each casing had to be sealed to the well wall along a portion of its length. In some instances the casings and their surrounding seals were perforated and in some instances, the lower portions of the casings were gravel packed. Such completions, while effective and workable, have a number of drawbacks. In the first place, a greater quantity of casing and cement is employed than is necessary. This greatly increases the expense. Additionally, when a plurality of casings are required to be separately completed with precise cementing at different levels of the well, the possibility of fouling up the completion and ruining the well are greatly magnified. Additionally, where a plurality of casings are employed, relatively complicated, precise techniques, with unusual cementing procedures or drilling procedures, such as "rat-holing" boreholes one within the other, are required.

Therefore, an object of the invention is to provide methods of producing oil from multiple horizon oil wells by means of gaseous pressurization, said methods employing a minimum amount of cement and casing for the well completion and also employing only a single permanent casing within any given well bore.

Another object of the invention is to provide methods of producing oil from multiple horizon oil wells, which methods are exceedingly simple and involve completion procedures embodying a minimum amount of risk to the well.

Another object of the invention is to provide methods of producing oil from multiple horizon oil wells wherein the production may be all from one production well yet production from the various horizons is easily and precisely controllable relative one another if desired.

Another object of the invention is to provide methods of producing oil from multiple horizon oil wells wherein the pressurization may be all from one pressurization well yet pressurization of the various horizons is easily and precisely controllable relative one another if desired.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Fig. 1 is a cross-sectional view through an earth formation showing a pressurization well extending to two oil formations therein, parts broken away to better illustrate the invention, a modification of the method also being included in this view permitting control of the pressurization to the two horizons.

Fig. 2 is a cross-sectional view through the same earth formation as Fig. 1 showing a production well extending through the two oil horizons with parts cut away to better illustrate the well completion.

Fig. 3 is a cross-sectional view through the same earth formation as Figs. 1 and 2 showing a production well similar to that of Fig. 2 extending through the two producing horizons, a modification of the method also being included in this view permitting control of the flows from the two horizons.

It is intended that the three figures illustrate wells in the same earth formation containing two oil sands or horizons. Therefore, the earth formations in the various figures will be numbered the same. Ground level is designated at 10. The upper oil horizon 11 and lower oil horizon 12 have impervious caps 13 and 14 respectively, topped by earth formations 15 and 16 respectively.

Referring now to Fig. 1, the borehole of a pressurization well, as shown at 17, is drilled at least to the top and preferably slightly into the top of the lowest oil horizon to be produced. A casing 18 is run within the borehole 17 at least to the top of the lower oil horizon 12. Casing 18 may extend slightly into the lower oil horizon, if desired, and has open lower end 19. The lower end of the casing 18 may be gravel packed as shown at 20. Casing 18 preferably has sealed bradenhead 21 at the top thereof with flow line 22 having valve 23 therein extending from one side thereof. The casing 18 is sealed from at least the top of the lowest oil horizon 12 to be produced to a level at least above the top oil horizon 11 to be produced. The seal is accomplished by filling the annulus between the casing 18 and the borehole 17 with a column 24 of cement or other suitable sealing substance. The pressurization casing 18 and its surrounding annular seal is perforated adjacent the top portion of the upper horizon 11 as shown at 25. Pressurization tubing 26 may be run, if it is desired to separately or controllably pressurize the two horizons, to a level below the perforations 25 and sealed to the inner surface of casing 18 by sealing means such as packer 26a. Tubing 26 is sealed through bradenhead 21 and has flow line 26b with valve 26c extending from one side thereof.

With valves 23 and 26c open, gaseous pressurization medium such as compressed air, or any other gas inert relative the hydrocarbon constituents of the formations 11 and 12, may be forced into the casing 18 and/or tubing 16 from which it moves into the upper portion of either or both of the two horizons 11 and 12 through the perforations 25 and from the open end 19 of casing 18. By shutting the valves 23 and 26c, any pressurization medium which has been forced into the casing 18 and tubing 26 may be sealed into the casing and earth formation to exert what pressure on the oil horizons it will.

Referring to Fig. 2, therein is shown a multiple horizon production well. Borehole 27 is drilled in earth formations 15 and 16 through oil horizons 11 and 12 to the vicinity of the bottom, either at, slightly above or slightly below the bottom of the lowest oil horizon to be produced. Casing 28 is run within the borehole 27 to the vicinity of the bottom of the oil horizon 12, either slightly above, at, or slightly below the bottom thereof. Casing 28 has conventional T 28a at the top thereof plugged at the top by plug 28b and having flow line 29 with valve 30 therein extending from one side thereof. Casing 28 is sealed to the well bore wall from the vicinity of the bottom of the horizon 12 and the casing 28 to a level above the upper oil horizon 11 to be produced by an annular column 31 of cement or other sealing substance. If the casing 28 and its surrounding annular seal 31 extend below or to the bottom of the horizon 12, the casing and the surrounding annular seal may be perforated as at 32 adjacent the bottom of the oil horizon 12.

If the casing 28 extends to slightly above the bottom of the oil horizon 12, the open end of the casing, with the cement seal 31 extending not below the bottom thereof, permits the influx of oil thereinto. The casing 28 and its surrounding annular seal is also perforated as at 33 adjacent the bottom of the upper oil horizon 11 to be produced.

Under impetus of the gaseous pressurization medium from a pressurization well such as in Fig. 1, oil will flow into the perforations 31 and 33 or into the open bottom of the casing 26a and the perforation 33. In Fig. 1, the annular sealing column 24 around casing 18 of the pressurization well prevents any loss of the pressurization medium into the earth formations 15 or 16 and, as well, into the oil horizon 11 except through the perforations 25. In Fig. 2, the annular seal 31 surrounding casing 28 prevents any gas or liquid migration into the earth formations 15 and 16 and through the oil horizons 11 and 12. When gaseous pressurization is applied to the top of the oil horizons 11 and 12 through the Fig. 1 pressurization casing 18, the existing gas cap in the formation is added to or one is created which expands both outwardly and downwardly. When the gas cap reaches the borehole 27, the annular seal 31 prevents any loss of the pressurization medium either upwardly above the horizons pressurized or downwardly through the horizons. Thus all of the pressure is applied to move the oil through the horizon and the oil exits the horizon through the casing 28.

In some instances, the distance between the oil horizons 11 and 12 may be many hundreds or thousands of feet. If such is the case, it is obvious that oil entering casing 28 through perforations 33 will merely run into and fill the casing 28 down to the lower horizon 12 or to whatever level the casing has already been filled. In such instances, it is desirable to provide means for segregating the oil between the horizons and avoiding the passage of oil from the horizon 11 therebelow. Such a modification of the method is shown in Fig. 3.

In this modification, the borehole 34 is drilled through the earth formations 15 and 16 and to the vicinity of the bottom of the lowest oil horizon to be produced 12. The relationship of the bottom of the borehole to the bottom of the lowest horizon is the same as that previously set forth relative borehole 27. Casing 35 is then run within the borehole 34 to the vicinity of the bottom of the lowest horizon to be produced 12. Once again, the relationships of the casing 35 to the bottom of the horizon 12 is the same as that of the casing 28 to the bottom of the horizon 12. Casing 35 is sealed to the well wall by annular column 36 of cement or other sealing substance which extends from the vicinity of the bottom of the horizon 12 and casing 35 as sealing column 31 relative casing 28 to a level above the top oil horizon 11 to be produced. The casing 35 and its annular seal 36 may be perforated as at 37 in the lowest oil horizon 12 to be produced adjacent the bottom thereof and is perforated as at 38 in the upper horizon 11 to be produced. Production tubing 39 is run within casing 35 at least below the perforations 38 and preferably to at least the lower horizon 12 or to the vicinity of the bottom thereof as shown in the figure. Tubing 39 is sealed to the inner face of casing 35 below the perforations 38 as by packer 40. Casing 39 has an open lower end or perforations 41 adjacent the lower end thereof. Casing 35 has sealed bradenhead 42 receiving the upper end of tubing 39 in sealing fashion and flow line 43 extending therefrom with valve 44 therein. Tubing 39 has conventional T 45 with plug 46 at the top thereof and flow line 47 having valve 48 extending from one side thereof. Pumping strings may be inserted through sealed bradenhead 42 into casing 35 to pump oil from the annulus between the tubing 39 and casing 35. A pumping string may be inserted in T 45 to pump oil from tubing 39.

The difference in operation from the method of Fig. 3 from that of Fig. 2 lies in the fact that oil passing through the perforation 38 in casing 35 is retained above the sealing or packing means 40 and may be taken out the flow line 43 or pumping means in the annulus between the casing 35 and tubing 39. Oil produced through the perforations 37 cannot rise above the packing means 40 and thus is produced through the perforations 41 in the tubing 39 by gravity or by pump.

It should be noted that a pumping string may be inserted through T 28a on casing 28 in Fig. 2 to pump oil from the casing 28. Said pumping string may extend to a level above the perforations 33 or therebelow or adjacent the perforations 31.

In original production situations where the pressures within the formations 11 and 12 are insufficient to flow desired quantities of oil into the casings 28 or 35, additional gaseous pressure may be applied to the top of the formation through the pressurization casing 18 and tubing 26. In secondary production situations, where the natural pressure in the horizons 11 and 12 is substantially depleted, application of sufficient gaseous pressure through the pressurization casing 18 and tubing 26 to the formations will permit production of oil through the production casings and tubings. Since both the pressurization and production wells are sealed as previously described, if the pressurization of the horizons has proceeded to a certain level, the application of pressurization to the horizon through the casing 18 may be ceased and the oil produced under the captured pressure within the horizons for an indefinite period of time.

All casing seals in both the pressurization and production wells must be of sufficient strength to secure whatever pressures are employed in driving the fluid and gaseous hydrocarbons downwardly through the sand bodies and must offer no means of escape for these pressures except at the points designated in the sands.

If it is desired to apply the method to wells having more than two producing horizons therein, the pressurization and production casings may be extended to the additional horizons, sealed as shown and completed as shown, the pressurization wells completed into the top of the lowest producing horizon and perforated at the tops of the above oil horizons. The production casings are completed through the oil horizons to the bottom portion of the lowest oil horizon to be produced and perforated at the bottoms of the above oil horizons.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A separate production well completion for production of oil from a plurality of oil horizons vertically spaced from one another in an earth formation comprising in combination a well bore extending from the surface to the vicinity of the bottom of the lowest oil horizon, a single production casing extending from the surface to the vicinity of the bottom of said lowest oil horizon, an annular column of sealing substance bonding said casing to the well wall at least from the vicinity of the bottom of each oil horizon to a level above each said oil horizon, at least one access opening through said casing communicating with the oil horizon adjacent the bottom of each of the oil horizons, a tubing positioned within the casing and extending from the surface to a level at least below the bottom of the upper horizon, and means sealing the outer surface of said tubing to the inner surface of the casing below the access opening to the bottom of the upper horizon whereby to block the annulus between the casing and tubing.

2. A separate pressurization well completion for aiding in producing oil from a plurality of oil horizons vertically spaced from one another in an earth formation comprising, in combination, a well bore extending from the surface to a level below the top of the lowest oil horizon, a single pressurization casing extending from the surface to at least the top of the lowest oil horizon, an annular column of sealing substance bonding the casing to the well wall at least from the top of the lowest oil horizon to a level thereabove and extending from a level below each other oil horizon at least to the vicinity of the top thereof and from the top of each other oil horizon to a level thereabove, at least one access opening through said casing communicating with the top portion of each oil horizon, a tubing positioned in the casing and extending from the surface to a level at least below the top of the upper oil horizon and means sealing the tubing to the inner surface of the casing below said top and below the access opening to the top oil horizon in order to block the annulus between the tubing and the casing.

3. Apparatus for producing oil from a plurality of oil horizons vertically spaced from one another in an earth formation by a vertical drive gaseous pressurization means comprising, in combination, a separate production well bore extending from the surface to the vicinity of the bottom of the lowest oil horizon, a single production casing extending from the surface to the vicinity of the bottom of said lowest oil horizon, an annular column of sealing substance bonding said casing to the well wall at least from the vicinity of the bottom of each oil horizon to a level above each said oil horizon, at least one access opening through said production casing communicating with the oil horizon adjacent the bottom of each oil horizon to be produced, a separate pressurization well bore extending from the surface to a level below the top of the lowest oil horizon, a single pressurization casing extending from the surface to at least the top of the lowest oil horizon, an annular column of sealing substance bonding the casing to the well wall at least from the top of the lowest oil horizon to a level thereabove and extending from the level below each other oil horizon at least to the vicinity of the top thereof and from the top of each other oil horizon to a level thereabove, at least one access opening through said pressurization casing communicating with the oil horizon adjacent the top portion of each oil horizon, a tubing positioned within the production casing and extending from the surface to a level at least below the bottom of the upper horizon and means sealing the outer surface of said tubing to the inner surface of the production casing below the access opening into the bottom of the upper horizon to block the annulus therebetween.

4. Apparatus for producing oil from a plurality of oil horizons vertically spaced from one another in an earth formation by a vertical drive gaseous pressurization means comprising, in combination, a separate production well bore extending from the surface to the vicinity of the bottom of the lowest oil horizon, a single production casing extending from the surface to the vicinity of the bottom of said lowest oil horizon, an annular column of sealing substance bonding said casing to the well wall at least from the vicinity of the bottom of each oil horizon to a level above each said oil horizon, at least one access opening through said production casing communicating with the oil horizon adjacent the bottom of each oil horizon to be produced, a separate pressurization well bore extending from the surface to the level of the top of the lowest oil horizon, a single pressurization casing extending from the surface to at least the top of the lowest oil horizon, an annular column of sealing substance bonding the pressurization casing to the well wall at least from the top of the lowest oil horizon to a level thereabove and extending from the level below each other oil horizon at least to the vicinity of the top thereof and from the top of each other oil horizon to a level thereabove, at least one access opening through said pressurization casing communicating with the oil horizon adjacent the top portion of each oil horizon, a tubing positioned in the pressurization casing extending from the surface to a level at least below the top of the upper oil horizon, and means sealing said tubing to the inner surface of the pressurization casing below said top and below the access opening to the top oil horizon in order to block the annulus between the tubing and the casing.

References Cited in the file of this patent

UNITED STATES PATENTS

| | | |
|---|---|---|
| 2,548,059 | Ramsey | Apr. 10, 1951 |
| 2,754,911 | Spearow | July 17, 1956 |
| 2,767,792 | Spearow | Oct. 23, 1956 |